No. 718,793. PATENTED JAN. 20, 1903.
T. I. RANKIN.
GAS HEATING APPARATUS FOR COOKING STOVES OR RANGES.
APPLICATION FILED APR. 8, 1899.
NO MODEL.
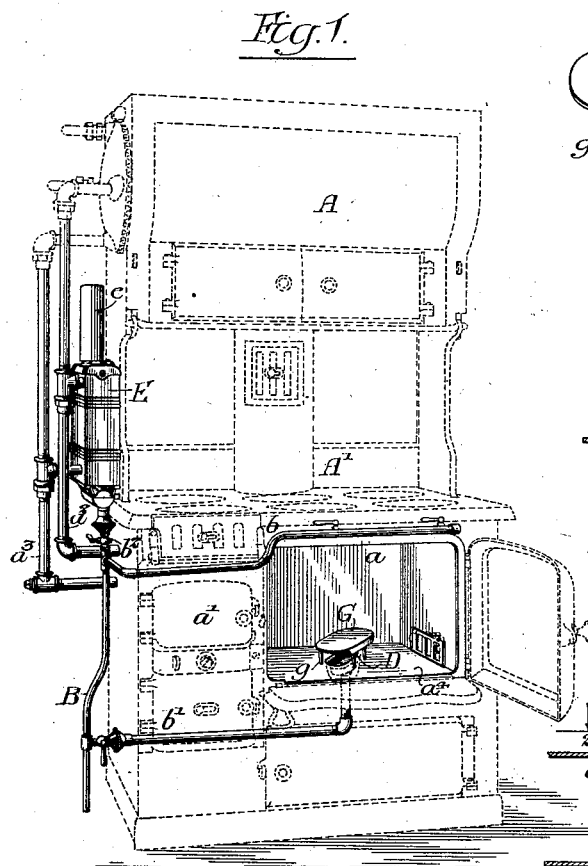
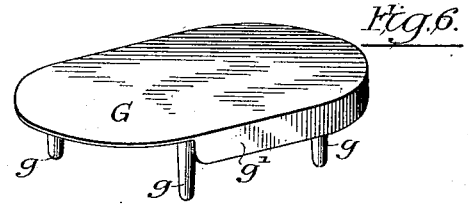
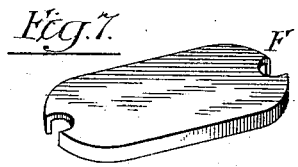
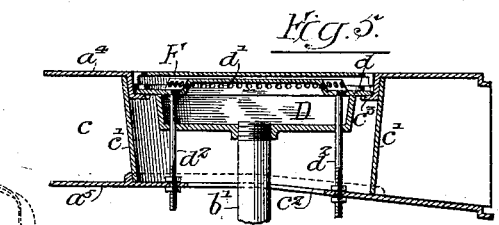
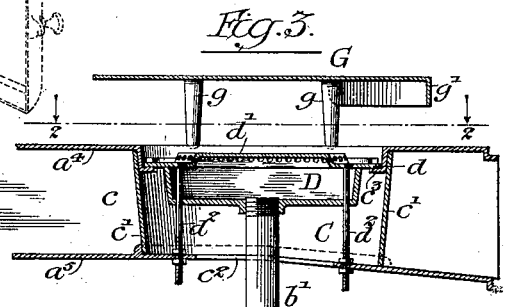
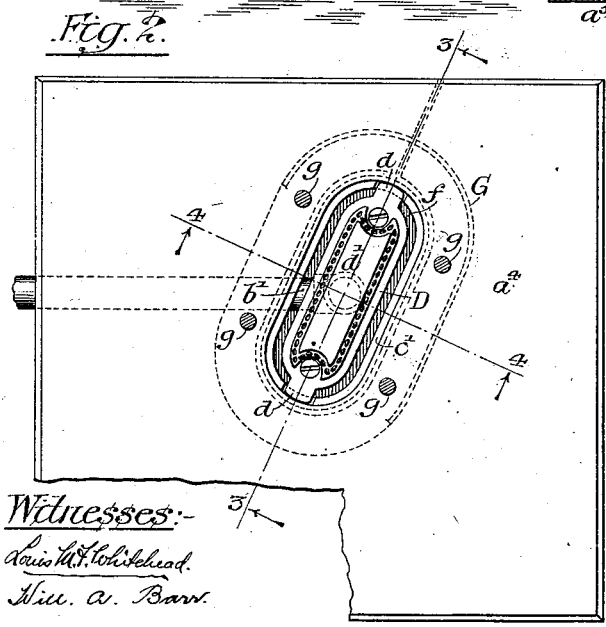
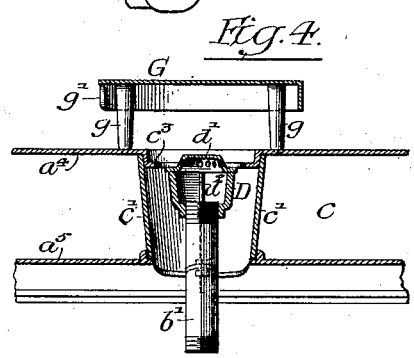
Witnesses:—
Louis W. F. Whitehead.
Wm. A. Barr.
Inventor:
Thomas I. Rankin.
by his Attorneys:—
Howson & Howson
THE NORRIS PETERS CO., PHOTO-LITHO., WASHINGTON, D. C.

UNITED STATES PATENT OFFICE.

THOMAS I. RANKIN, OF PHILADELPHIA, PENNSYLVANIA, ASSIGNOR TO THE ABRAM COX STOVE COMPANY, OF PHILADELPHIA, PENNSYLVANIA, A CORPORATION OF PENNSYLVANIA.

GAS HEATING APPARATUS FOR COOKING STOVES OR RANGES.

SPECIFICATION forming part of Letters Patent No. 718,793, dated January 20, 1903.

Application filed April 8, 1899. Serial No. 712,252. (No model.)

*To all whom it may concern:*

Be it known that I, THOMAS I. RANKIN, a citizen of the United States, residing in Philadelphia, Pennsylvania, have invented certain Improvements in Gas Heating Apparatus for Cooking Stoves or Ranges, of which the following is a specification.

My invention relates to certain improvements in gas heating apparatus connected with an ordinary cooking stove or range.

The object of my invention is to provide a gas-heater for an oven of a stove or range that will not interfere in any way with the proper heating of the oven when coal or wood is used.

In the accompanying drawings, Figure 1 is a perspective view in dotted lines of a portable range, illustrating my improvements in full lines. Fig. 2 is a sectional plan view on the line 2 2, Fig. 3, showing the burner for heating the oven by gas. Fig. 3 is a section on the line 3 3, Fig. 2. Fig. 4 is a section on the line 4 4, Fig. 2. Fig. 5 is a view similar to Fig. 3 with the cover-plate closing the opening in the bottom plate of the oven applied when the gas-heater is not used. Fig. 6 is a detached perspective view of the deflector-plate. Fig. 7 is a perspective view of the cover-plate for the burner.

A is one form of an ordinary range of the portable type, having in the present instance a single oven $a$ and a fire-chamber $a'$, which is at one side of the oven. Extending over and under the oven and at one side thereof is a flue $c$, so that the products of combustion from the fire-chamber will pass around the oven before entering the chimney.

Directly above the range in the present instance and supported thereby is a horizontal boiler $A'$.

$a^2$ $a^3$ are pipes leading from the water-back on one side of the fire-box to the boiler.

It is now the practice to combine gas heating apparatus with the ordinary coal or wood range, so that either fuel can be used; but it has been a difficult matter to properly heat the oven with gas apparatus without interfering with the proper heating of the oven when coal or wood is used.

By my invention I am enabled to heat the oven with either coal or gas, or with both, the use of one fuel not interfering with the use of the other.

As mentioned above, there is a flue $c$ between the bottom plate $a^4$ of the oven and the bottom plate $a^5$ of the range. This flue leads from the fire-chamber to the smoke-flue or chimney. I mount a casing $c'$ within this flue, making comparatively tight joints between the bottom plate of the oven and the bottom plate of the range and the casing and form an opening $c^2$ in the bottom plate of the range and also an opening in the bottom plate $a^4$ of the oven.

Mounted within the chamber C, formed by the casing and the two bottom plates, is a burner D. This burner has a flange $d$, which rests on lugs $c$, formed on the bottom plate $a^4$ of the oven, and these lugs are sufficiently below the surface of the bottom plate that the burner will not interfere with the placing of a cover-plate F, Fig. 7, over the opening formed by the recess C, as illustrated in Fig. 5.

The burner in the present instance is made in two parts. The base portion of the burner is secured to the inlet-pipe $b'$, leading to the gas-supply pipe B, while the cap $d'$ of the burner is provided with the flanges $d$ and is perforated for the escape of gas.

In the present instance the opening in the bottom plate of the oven is elongated, as shown in Fig. 2, and the burner is also elongated, but is sufficiently less in diameter than the opening as to provide a space $f$ between the burner and the flange $c^3$ of the bottom plate of the oven, so as to admit the proper quantity of air to aid combustion. In the present instance I have shown the cap $d'$ secured to the bottom plate $a^5$ of the range by bolts $d^2$, the bolts passing through the cap and the body of the burner and through openings in the bottom plate of the range. By tightening these bolts the burner is drawn down onto the flange of the bottom plate of the oven, thus making a secure and rigid structure.

When the gas-burner is not in use, I mount in the recess within which the burner rests a cover-plate F, (shown in Fig. 7,) which is so shaped as to fit within the recess, so that its upper surface will be flush with the upper surface of the plate, as in Fig. 5. When this plate is removed so that the burner can be used, I preferably mount above the burner a deflector G. (Shown in Figs. 3, 4, and 6.) This deflector has legs *g g* in order to elevate it above the burner and is preferably provided with a depending flange *g'*, extending around a portion of its edge in order to insure the best distribution of the heat.

It will be noticed that the burner is arranged back of the center of the oven, and as the natural draft will tend to throw the flame from the burner to the rear of the same the flange *g'* is provided to act as a baffle-plate or as an auxiliary deflector for the flame.

It will be seen by the construction noted above that the burner D and the casing within which the burner is mounted in no way interfere with the draft of the range when coal is used as a fuel. Air cannot enter the flue *c* through the chamber C, as the casing *c'* is close fitting and is a permanent part of the range.

The gas-supply pipe B is not only coupled in the present instance to the pipe *b'*, leading to the burner D, but is also coupled to a pipe *b*, leading to burners directly under two of the cover-plates of the stoves, and to a pipe *d²*, leading to the water-heater E. This particular water-heater is fully described and claimed in the patent granted to me on December 4, 1900, No. 663,363.

It will be noticed in Fig. 3 that I prefer to mount the casing *c'*, which divides the chamber C from a flue, on a line with the partition-plate of the flue, as shown by dotted lines in Fig. 2, as in this construction the casing forms a continuation of the division-plate.

I claim as my invention—

1. The combination in a stove or range adapted to burn either solid or gaseous fuel and having an oven, and a flue between the bottom plate of the oven and the bottom plate of the range, of a permanent and imperforate casing mounted between the said bottom plates within the flue and forming a burner-chamber entirely cut off from the flue, openings in the two bottom plates communicating with the said chamber, and a burner within the casing, substantially as described.

2. The combination in a stove or range adapted to burn either solid or gaseous fuel and having an oven, and a flue between the bottom plate of the oven and the bottom plate of the range, of a permanent casing mounted between the said bottom plates within the flue and forming a burner-chamber, openings in the two bottom plates communicating with the said chamber, a burner within the casing, the top of the burner being below the surface of the bottom plate of the oven, and a cover-plate flush with the bottom of the oven and closing only the opening therein, substantially as described.

3. The combination of a casing, a gas-burner mounted in the chamber formed by the casing, a deflector-plate arranged above the chamber and located directly over the burner, and a depending flange extending partly around said deflector-plate and acting as an auxiliary deflector or baffle-plate, substantially as described.

4. The combination in a stove or range adapted to burn either solid or gaseous fuel and having an oven, a permanent casing mounted between the bottom plate of the oven and the bottom plate of the range, a depressed flange on the oven bottom plate extending into the chamber formed by the casing and retaining the casing in place, openings in the bottom plates of the oven and casing communicating with the chamber, a burner within the chamber, and a supply-pipe for the burner extending through the opening in the bottom plate of the range, substantially as described.

5. The combination in a stove or range adapted to burn either solid or gaseous fuel and having an oven, and a flue between the bottom plate of the oven and the bottom plate of the range, a casing mounted in said flue, openings in the bottom plate of the oven and in the bottom plate of the range so that the chamber formed by the casing will be open to the atmosphere and to the oven but will be cut off from the flue, a flange on the bottom plate of the oven, a burner having flanges on each end resting upon the flanges of the bottom plate of the oven, the burner being less in width than the opening in the bottom plate of the oven, so as to form a passage for air to aid combustion, substantially as described.

In testimony whereof I have signed my name to this specification in the presence of two subscribing witnesses.

THOMAS I. RANKIN.

Witnesses:
 WILL. A. BARR,
 JOS. H. KLEIN.